United States Patent [19]

Fritts

[11] E Re. 28,822

[45] Reissued May 18, 1976

[54] SAFETY INTERLOCK SYSTEM FOR MICROWAVE OVENS

[75] Inventor: Rex E. Fritts, Cedar Rapids, Iowa

[73] Assignee: Amana Refrigeration, Inc., Amana, Iowa

[22] Filed: Aug. 22, 1974

[21] Appl. No.: 499,747

Related U.S. Patent Documents

Reissue of:

[64] Patent No.: 3,766,437
Issued: Oct. 16, 1973
Appl. No.: 240,626
Filed: Apr. 3, 1972

[52] U.S. Cl. ..... 317/40 R; 317/9 A; 317/40 A; 317/135 R; 317/136; 307/94; 219/10.55 C

[51] Int. Cl.[2] ..... H02H 5/04

[58] Field of Search ..... 317/9 A, 9 R, 135 R, 317/136; 307/94; 219/10.55 B, 10.55 C

[56] References Cited

UNITED STATES PATENTS

| | | | |
|---|---|---|---|
| 2,718,630 | 9/1955 | Wait | 340/275 |
| 2,855,235 | 10/1958 | Dellen | 340/275 |
| 3,624,334 | 11/1971 | Chapell | 219/10.55 C |
| 3,699,299 | 10/1972 | Umezo et al. | 219/10.55 C |
| 3,715,552 | 2/1973 | Umezo et al. | 219/10.55 C |
| 3,715,554 | 2/1973 | Umezo et al. | 219/10.55 C |
| 3,857,067 | 12/1974 | Zanboorie | 219/10.55 C |

*Primary Examiner*—R. N. Envall, Jr.
*Attorney, Agent, or Firm*—Milton D. Bartlett; Joseph D. Pannone; Edgar O. Rost

[57] ABSTRACT

A safety interlock system is disclosed for microwave ovens or other high voltage electrical apparatus incorporating sensor means for detecting any malfunction. Means are provided for interrupting line input power or actuating a failure indicating device or a combination of both. Thermally actuated means, such as bimetallic or meltable elements, as well as circuit breakers, relays and fuses are described. The sensor means are associated with each of the interlocks and do not carry regular equipment-load current until such time as a malfunction of the companion interlock occurs. Replacement of the faulty equipment by authorized personnel and manual resetting of the interrupt or indicating means before the oven is energized again reduce the risk of accidental radiation, electrical shock or damage to the apparatus.

9 Claims, 10 Drawing Figures

DC RECTIFIER CIRCUIT
33
TRANSFORMER
31
30
MAGNETRON ENERGY GENERATOR
100
30-MIN.
104
L
102
94
T
5 MIN.
98
L
90
M
92
FAN
96
52
LATCH INTERLOCK
THERMAL SWITCH
106
ON-OFF SWITCH
82
L
88
INTERLOCK (A)
114
116
SENSOR
84
80
112
FAILURE WARNING
86
SENSOR
110
108
INTERLOCK (B)
THERMALLY ACTUATED SWITCH
THERMALLY ACTUATED SWITCH
80
76
74

FIG. 9
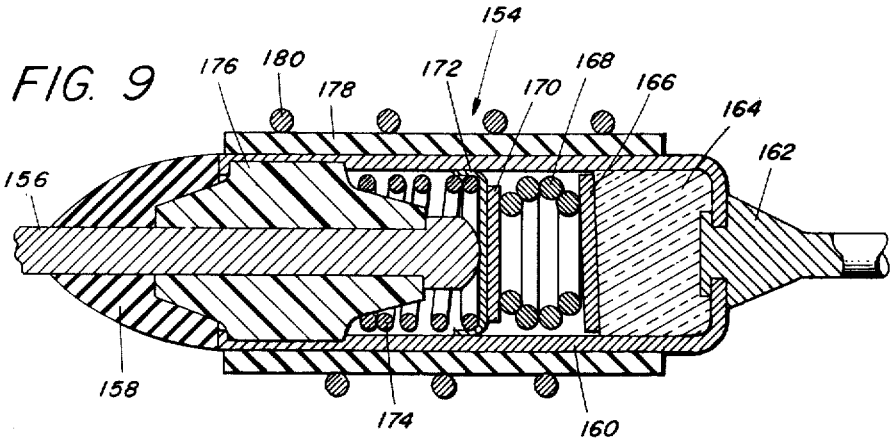
(BEFORE)
THERMAL LIMITER
(AFTER)
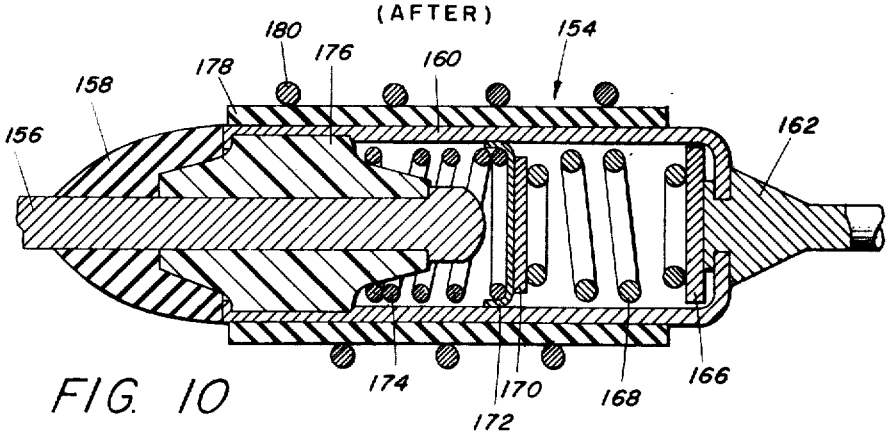
FIG. 10

SAFETY INTERLOCK SYSTEM FOR MICROWAVE OVENS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to electrical apparatus and, particularly, to an interlock system for safe operation of microwave ovens.

2. Description of the Prior Art

A source of microwave energy utilized in microwave ovens is the magnetron which is now well known in the art. Such generators provide for radiation of energy within an enclosure to heat any article disposed therein. Radiation of such energy outside of the enclosure in certain instances may constitute harmful exposure and safety standards have been established by regulatory agencies in this area. Magnetron energy generators conventionally operate from regular line sources of low frequency and low voltage which is stepped up to very high DC rectified voltages of approximately 4,000 to 6,000 volts. To provide for safe operation of such apparatus, interlock switches operatively associated with the oven door and/or manual latches have evolved in the prior art to interrupt the line power and, particularly, to interrupt the radiation of energy until the door to the enclosure is closed. Further, such interlock switches prevent serious damage to the expensive equipment and are intended with associated electrical circuitry to substantially reduce any hazards associated with the high voltage supplies.

Other extended periods of time, it has been noted that interlock switches which are continually carrying currents of substantial magnitude fail by welding of the contacts in a closed position to render them completely ineffectual as a safety device. In numerous embodiments of microwave ovens plural interlock switches are employed and in some instances additional ones may be employed. It is possible for more than one of these safety switches to fail which further amplifies the problem of providing for safe operation.

A need arises, therefore, with the increased population of microwave ovens for an interlock system which will immediately disable the circuit upon the failure of any interlock means and signal such failure for repair by authorized personnel before a potentially dangerous condition arises.

SUMMARY OF THE INVENTION

In accordance with the invention, an interlock switch system is provided with each of the interlock means having an associated companion sensor means which does not carry the full equipment-load current when the oven is operative. The sensor means detect any malfunction of the interlock means and in the illustrative embodiments to be hereinafter described, either actuate failure warning means or interrupt the input power or a combination of both. Thermally actuated latching means are provided in one embodiment to carry the full input voltage in the event that the interlock switch has failed closed by reason of the welding of the contacts. The heating of the thermal means causes associated contacts or a relay to open to immediately disable the oven. The thermal actuated means are replaced only by qualified service personnel. Structure is also provided for a manual reset to prevent operation until such repairs are effected.

Another embodiment provides for the actuation of failure warning means such as, for example, visible or audible signal alarm devices or a combination of both. Such alarms also permit safe operation of microwave ovens by persons deprived of either sight or audio perception. Other combinations involve the interruption of the application of line power upon the sensing of an interlock failure as well as provisions for indicating such failures to prevent further unsafe operation. Meltable elements such as thermal limiters or fuses, as well as relays, circuit breakers and the like, can all be utilized in the disclosed systems.

The structure of the invention can be employed singularly with an interlock switch structure. Once the interlock fails, however, the interruption of current or alarm signalling does not occur until the door is opened again. To give the best possible protection it is, therefore, desirable to provide for plural interlock and sensing means. If one interlock fails, the other actuates the failure warning means and permits detection and repair of the defective interlock before further operation is resumed.

Relay contact means in series with the input voltage source and the warning and sensing means will provide for combined notification of the failure as well as disabling of the circuits at the time of the failure rather than a latter period of time. Further improvements in the embodiments of the invention are described including circuit breakers with current limiting means or fuses which will disable the circuit upon interlock failure. All the foregoing embodiments of the invention may be practiced on existing microwave oven equipments or any electrical apparatus simply and inexpensively.

BRIEF DESCRIPTION OF THE DRAWINGS

Details of the illustrative embodiments of the invention will be readily understood after consideration of the following description and reference to the accompanying drawings, wherein:

FIGS. 9 and 10 are detailed cross-sectional views of a thermal actuated limiter device for use in the embodiments of the invention.

DESCRIPTION OF THE PREFERRED EMBODIMENTS

Figure 1:
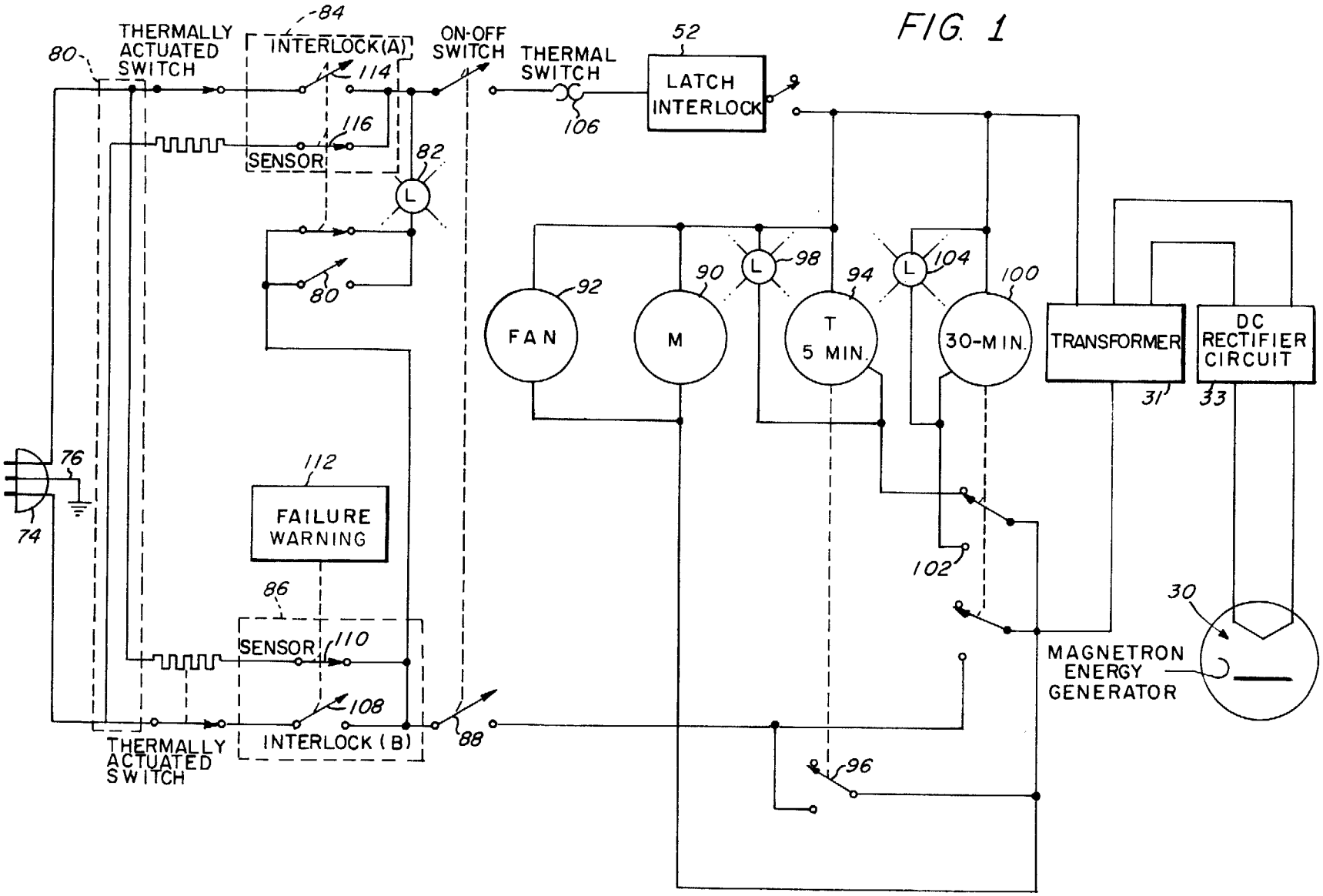
FIG. 1 is a block diagram of a microwave oven electrical circuit embodying the invention.
Figure 2:
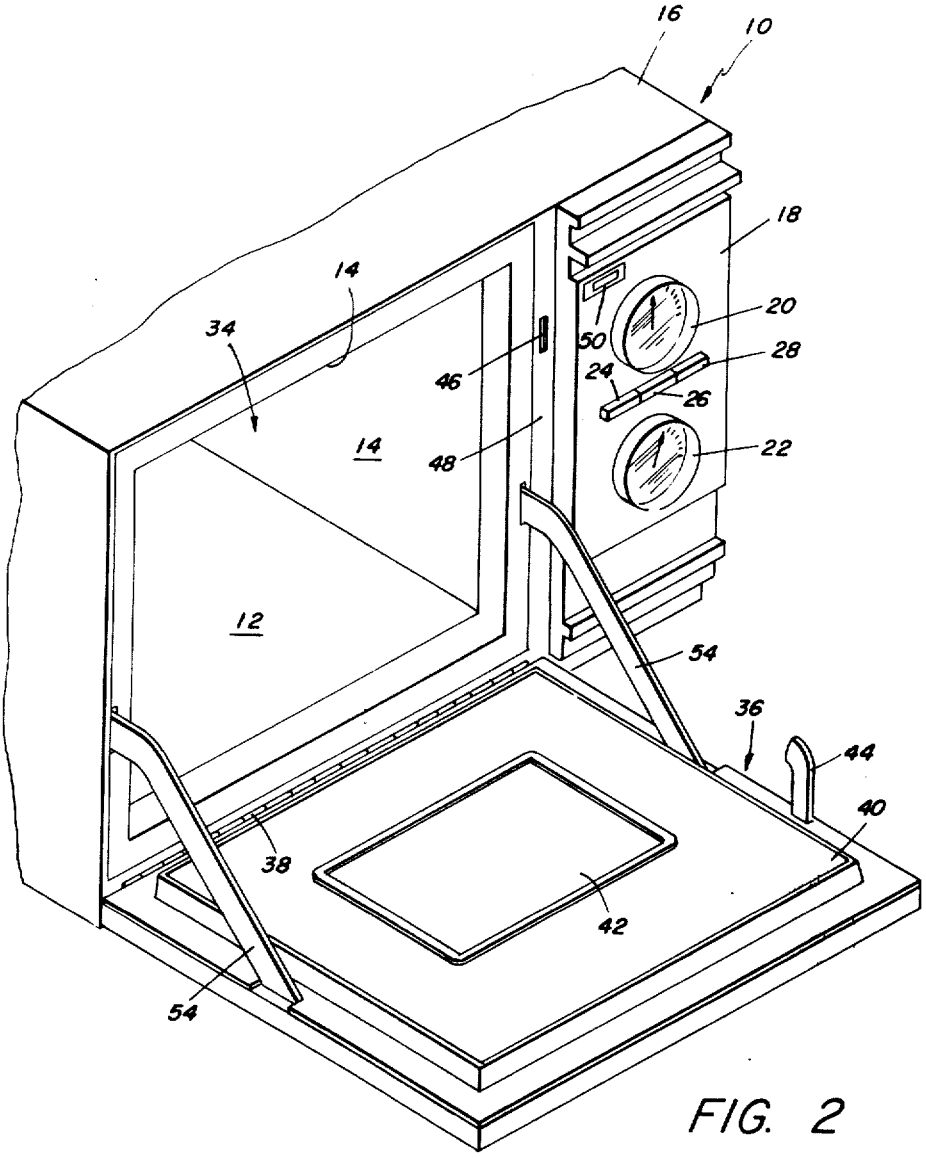
FIG. 2 is an isometric view of a portion of a microwave oven embodying the invention.

In FIG. 1 a block diagram of the electrical circuit is shown for a microwave oven incorporating the safety interlock switch means, means for sensing and means for interruption of line input power or actuation of a failure warning device. A microwave oven 10 incorporating the invention will now be described with reference being directed to FIGS. 2 and 3. A hollow cavity enclosure 12 is defined by conductive walls 14 with the dimensions of the enclosure being selected to excite numerous modes of microwave energy at desirably a frequency of 2,450 MHz which is one of the allotted frequencies for such devices. Case 16 surrounds the oven enclosure as well as the high voltage electrical circuits, controls and microwave energy source. Control panel 18 has a 5-minute timer switch 20 as well as 30-minute switch 22 mounted on the front face. Control buttons 24, 26 and 28 provide for, respectively, start, stop and light control.

The source of electromagnetic energy is the magnetron 30 and its accompanying high voltage electrical circuits have been indicated by block 32. Both of these components are now considered to be well known in the art and need not be further described.

Access to the interior of the oven enclosure 12 is provided by means of opening 34 closed by means of door assembly 36 which has been illustrated as of the drop-down type with a bottom hinge 38. The door assembly 36 has an inner cover 40 with a window 42 of a high dielectric loss material to assist in maintaining the cleanliness of the oven as well as providing secondary energy absorbing means for any radiated energy escaping around the periphery of the opening. Latch 44 is mounted on door assembly 36 and engages mating slot 46 in a peripheral front wall 48 surrounding the access opening 34. A mechanically actuated latch-locking arrangement 50 is slidably disposed within the control panel 18. An interlock switch 52 is controlled by latch 44 to break the circuit upon any accidental opening of the door assembly 36 while the oven is operated. Movement of the drop-down type door assembly 36 is controlled by a pair of spring-tensioned counterbalanced arms 54.

Figure 3:
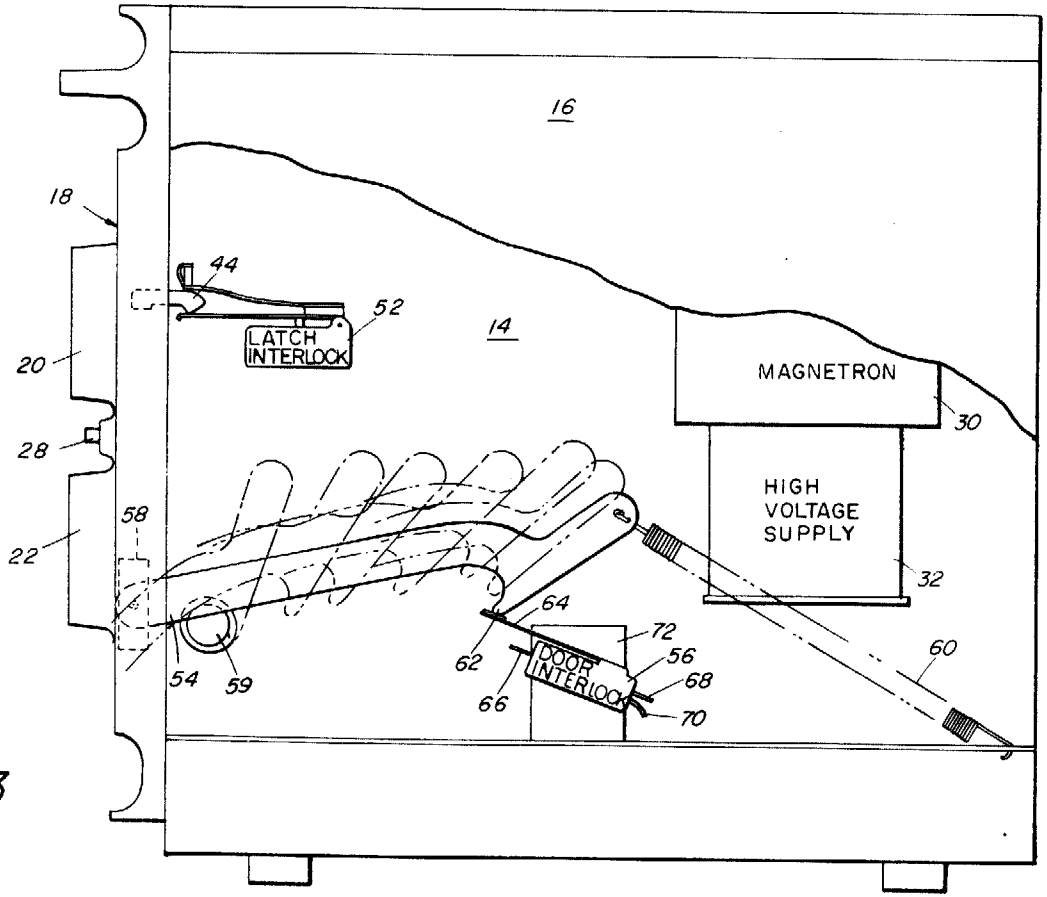
FIG. 3 is a side elevation view partially broken away of the embodiment shown in FIG. 2 disclosing a door actuated interlock.

In FIG. 3 the complete door control apparatus, as well as the safety interlock switches 56, which are contacted by the arms 54 are shown in various positions in a side elevation view with a portion of the outer case 16 broken away to show internal structure. Arms 54 are pivotally supported by means of brackets 58 attached to the side of the door assembly 36. A bearing member 59 of a low-friction, long-wearing material, such as Nylon, provides a riding surface for each arm. Spring 60 is attached to the inner end and bottom wall of the oven to provide the appropriate tensioning. Each of the arms 54 has a hook-shaped portion 62 which in the final closed position engages and depresses lever arm 64 to close the interlock switch 56 contacts which are normally in the open position. Terminal connectors 66, 68 and 70 provide for the connection of the door interlock switch to the appropriate electrical circuit for operation of the microwave oven. A right and left door interlock switch is provided and appropriately mounted by means such as bracket 72 attached to oven enclosure wall 14. Similarly, the latch interlock switch 52 is supported from the oven enclosure wall 14.

Referring again to FIG. 1, the electrical circuit of a microwave oven will be described. A conventional three-terminal connector 74 having a grounded lead 76 is connected to the conventional domestic or industrial line voltage source. A terminal board 78 interconnects all of the components to the line voltages. Light switch 80 controlled by the previously-described button 28 actuates an oven light 82 to illuminate the interior of the oven enclosure. A right and a left door interlock switch and sensor-arrangement 84, 86 in accordance with the teachings of the invention is interconnected to start-stop switch 88 which is also actuated by the panel mounted buttons 24, 26 previously described. Conventional means for the distribution of the microwave energy, such as a mode stirrer, is actuated by means of motor 90. A fan 92 is provided to cool the magnetron energy generator 30 as well as the high voltage components including transformer 31 and DC rectifier circuit 33. The 5-minute timer motor 94 is controlled by means of switch 96 which is actuated by knob 20 on panel 18. Dial light 98 is also provided in the timer arrangement. The 30-minute timer motor 100 is actuated by switch 102 and is controlled by means of knob 22 on the panel. Dial light 104 is associated with this timer component. The mainline voltages are interconnected to the remaining components in the circuit through thermal circuit breaker 106, latch interlock switch 52 and door interlocks 84 and 86 to provide the main safety interlock system.

The problem which arises in the provision of interlock switches is that over extended periods of time the contacts may become welded closed and energy will be radiated within the enclosure upon the opening of the door. The present invention provides sensing means as well as failure warning means to eliminate any adverse results of interlock malfunction. To achieve these objectives the systems embodying the invention provide companion sensor means for detecting the positioning of the interlock which are nonequipment-current bearing during normal operation of the oven. Such sensor means detect an interlock malfunction and are operatively associated with the mainline voltage interruption means or failure warning devices such as an audible or visual alarm signal. In FIG. 1 the left door interlock 86 is designated with a lever arm 108 together with a companion lever arm 110 which is oriented in the opposite position. When interlock switch 108 is opened, sensor switch 110 is closed and vice versa. In addition, a failure warning device 112 is shown coupled to the sensor switch. To give the maximum protection it is advisable to provide both door interlock switches with the sensor and interruption or warning means and the right door interlock switch 114 and sensor switch 116 are shown.

Figure 4:
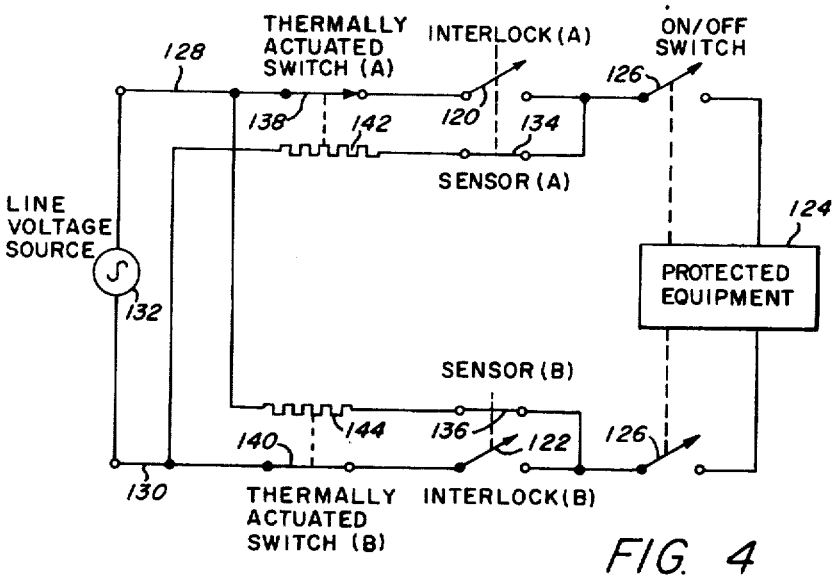
FIGS. 4–8 are schematic circuit diagrams of illustrative embodiments of the invention.

Referring now to FIG. 4, an exemplary interlock-sensor switch arrangement is shown employing thermally actuated means for interrupting the main line voltages and protecting the microwave oven 124. The conventional on/off switch 126 is provided and main voltage lines 128 and 130 are coupled to the line voltage source 132. Each of the interlock switches 120, 122 has an associated sensor means 134, 136 for detecting the positioning of the interlock switches. Circuit interruption means are coupled to the main line voltage connections 128 and 130 and comprise thermally actuated latching switches 138 and 140, each having an associated thermal element 142, 144.

The safety interlock system operates in the following manner. Interlock switches 120, 122 are in the open position and sensor means 134, 136 are then in the closed position. When the on/off switch 126 is actuated and the oven door is closed, interlock switches 120, 122 close and sensor means 134, 136 open. Hence, when the equipment load is energized the interlock switches carry the main line voltages and the sensor means are noncurrent-carrying. In the event of an interlock malfunction such as the welding of the contacts and the sensor means 134, 136 remain closed, voltage will be applied through thermal elements 142 or 144, dependent on the respective defective interlock switch, causing heating. At a predetermined temperature switch contacts 138 or 140 open thereby disabling the complete circuit. The first interlock switch to fail and its associated sensor means will disable the circuit. It is desirable that the contacts remain open until the required repairs are made to prevent unsafe operation. For this reason latching means are provided in the thermally actuated switches 138, 140 require a manual resetting after the necessary repairs have been effected. The plural safety interlock system incorporating sensor and detecting means with each interlock switch is preferable in view of the fact that input power interruption is automatic when the door is opened and a malfunction condition exists.

Figure 5:
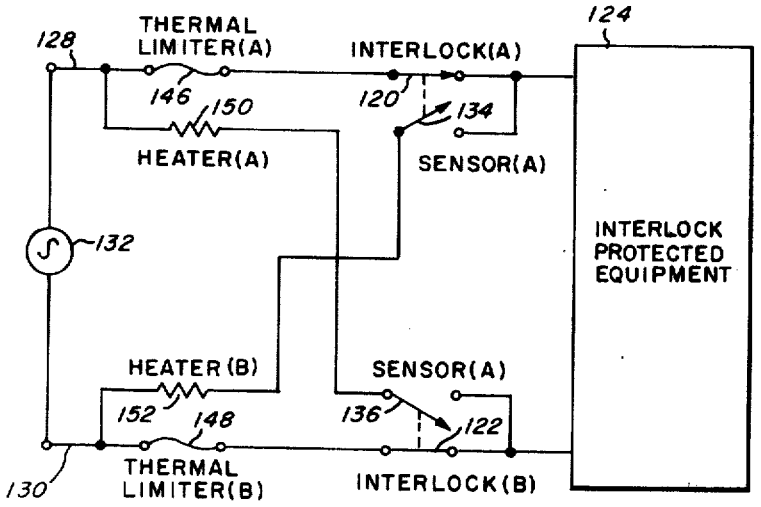

Referring now to FIG. 5, an alternative system is disclosed employing thermal limiters 146, 148 together with heaters 150, 152 which will result in disintegration of an element in the thermal limiters upon an interlock malfunction. In this and the remaining alternative embodiment descriptions, similar components have been designated by similar reference numerals. In this embodiment an interlock failure which results in the line power being applied through the sensor means 134, 136 is applied to a heater or resistor which will rapidly disintegrate its associated thermal limiter element and break the circuit. In this embodiment a new thermal limiter would be installed at the time the necessary repairs are made.

An exemplary thermal limiter protector for utilization in this embodiment for components 146, 148, 150 and 152 is disclosed in a copending patent application, Ser. No. 239,480 filed Mar. 30, 1972, now U.S. Pat. No. 3,717,793 issued Feb. 29, 1973 by Donald E. Peterson. Such devices have been illustrated in FIGS. 9 and 10 in the before and after firing condition. Such thermal limiter devices 154 comprise a conductive lead 156 encased in a sealing compound 158 secured at one end of a conductive case 160 while lead 162 is disposed at the opposing end and is conductively secured to the case 160. A pellet 164 of a non-conductive material which rapidly disintegrates at a predetermined temperature is disposed in contact with a disc member 166 to urge spring 168 against disc member 170. A metallic star contact member 172 is in contiguous relationship with disc member 170 and the interior walls of the conductive case 160 as well as the inner end of lead 156. A trip spring 174 urges the contact member 172 in the opposite direction and is maintained in position by a ceramic bushing 176, though which lead 156 is disposed. Electric isolation means such as insulating tape 178 has disposed adjacent its outer wall thermal means 180 such as a heater wire or electrical resistor which is connected to the branch circuit with the sensor means 134, 136 while the leads 156, 162 are connected to the main voltage lines 128, 130. In normal operation, the thermal limiter leads carry the main equipment current and the means disposed in thermal contact with the thermal limiter are actuated upon failure of the interlocks.

In FIG. 10 the fired condition of the thermal limiters is illustrated which disables the oven circuits upon an interlock malfunction. The pellet 164 has been disintegrated and lead 156 no longer contacts star contact member 172. Spring 168 is fully extended with disc member 166 now positioned against the interior of the connecting lead 162. The intervening space prevents the conduction of any current and effectively disables the circuit.

Figure 6:
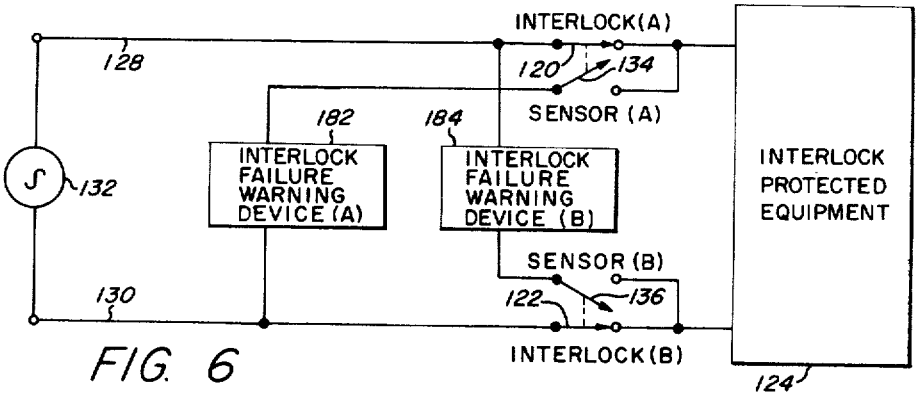

Referring to FIG. 6, another feature of the invention will be described relating to the provisions of failure warning means 182 and 184 in series with the interlock position sensor means 134 and 136. Such warning devices may be of any nature, as for example, lights or audible sounding devices or a combination of both. Such devices will also assist in the safe operation of microwave ovens by persons deprived of either sight or sound perception. In this embodiment, no power-interrupt means have been illustrated, however, it is realized that in the practice of the invention a combination of both the interrupt and failure warning means may be desirable.

Figure 7:
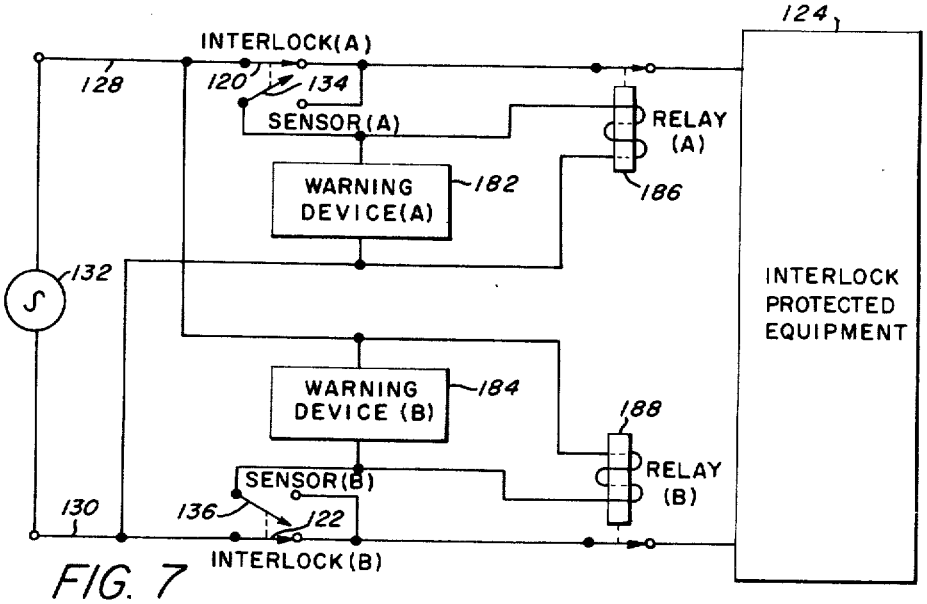

In FIG. 7 a combination of interrupt and warning means are illustrated including relays 186, 188 connected in parallel across each of the interlock failure warning devices 182, 184. The contacts of the relays are in series with the line voltage source and connections 128, 130. In the event of a malfunction of the interlock, the alarm is presented and power is also interrupted to deenergize the oven. An alternative method of providing the same protection comprises a single relay with two sets of coils and two sets of contacts. Such a structure would conserve space and be less expensive. Latching or locking means may also be provided to maintain the relay contacts open in order that the equipment cannot be operated until the defective equipment is replaced.

Figure 8:
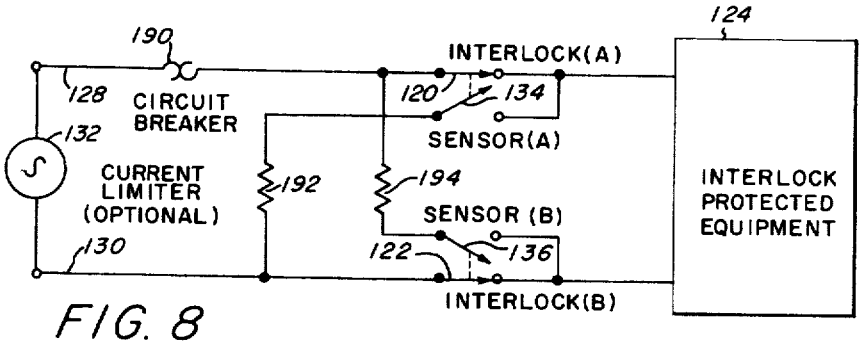

In FIG. 8 another alternative embodiment of the invention is illustrated incorporating means for interrupting the application of the line voltages. A circuit breaker 190 or fuse is connected in the main line voltage connections 128, 130. The sensor means 134, 136 apply sufficient current through the circuit breaker upon an interlock malfunction to cause the opening of the contacts or a melting of the fuse element. Resistances 192 and 194 may also be provided in series with the sensor means to limit the current flowing through these branches of the circuit and thereby protect the equipment from damage.

While the foregoing illustrative embodiments of the invention have been described with relation to microwave ovens, the interlock systems are equally applicable to any high voltage electrical supplies, transmitters or other electrical equipment requiring the complete functioning of interlocks to protect the operator as well as the equipment. In the designing of the components for the various systems a slight delay may be provided in the operation of the interlock and sensor means to avoid false alarms by having the interlock open before the sensor means closes. Similarly, the interlock should close after the sensor means opens. Numerous substitutions in the components may be practiced by those skilled in the art without departing from the spirit and scope of the invention. It is intended, therefore, that the foregoing detailed description of the illustrative embodiments be considered broadly and not in a limiting sense.

I claim:

1. A safety interlock system for electrical apparatus comprising:

[an] electrical circuit [including] *means for coupling* a [connected] voltage source [and] *to a load;*

*said circuit means comprising* interlock switch means actuated by predetermined means *coupled between one terminal of said voltage source and one terminal of said load;* sensor means *coupled in series with said interlock switch means and said voltage source* for detecting the malfunction of said interlock switch means [ with ];

said interlock switch means *being* normally closed and said sensor means *being* normally open when said apparatus is operative; and

*resettable switch* means [ operatively associated with ] *actuated in response to current through* said sensor means to [ deenergize ] *disable* said *electrical* circuit *means* upon the detection of an unsafe operating condition [ with ] *when* both said interlock switch and sensor means *remain* in closed positions.

2. [ The system according to claim 1 ] *A safety interlock system for electrical apparatus comprising:*

*electrical circuit means for coupling a voltage source to a load;*

*said circuit means comprising interlock switch means actuated by predetermined means coupled between one terminal of said voltage source and one terminal of said load;*

*sensor means coupled in series with said interlock switch means and said voltage source for detecting the malfunction of said interlock switch means;*

*said interlock switch means being normally closed and said sensor means being normally open when said apparatus is operative; and*

*resettable switch means actuated in response to current through said sensor means to disable said electrical circuit means upon the detection of an unsafe operating condition when both said interlock switch and sensor means remain in closed positions* wherein said circuit [ deenergizing ] *disabling* [ comprise ] *comprises* thermally actuated means coupled in series with said sensor means and said voltage source.

3. [ The system according to claim 1 ] *A safety interlock system for electrical apparatus comprising:*

*electrical circuit means for coupling a voltage source to a load;*

*said circuit means comprising interlock switch means actuated by predetermined means coupled between one terminal of said voltage source and one terminal of said load;*

*sensor means coupled in series with said interlock switch means and said voltage source for detecting the malfunction of said interlock switch means;*

*said interlock switch means being normally closed and said sensor means being normally open when said apparatus is operative; and*

*resettable switch means actuated in response to current through said sensor means to disable said electric circuit means upon the detection of an unsafe operating condition when both said interlock switch and sensor means remain in closed positions* wherein said circuit [ deenergizing ] *disabling* means [ comprise ] *comprises* a thermally [ disintegratable ] *actuated* element coupled in series with said sensor means.

4. A safety interlock system for electrical apparatus comprising:

an electrical circuit including a [ connected ] voltage source and interlock switch means actuated by predetermined means *directly coupled to one side of said voltage source;* sensor means *coupled to the other side of said voltage source* for detecting the malfunction of said interlock switch means , [ with ] said interlock switch means *being* normally closed and said sensor means *being* normally open when said apparatus is operative; [ and ]

*circuit deenergizing means* [ operatively associated ] *coupled in series* with said sensor means *and said voltage source* to [ deenergize ] *disable* said circuit upon the detection of an unsafe operating condition [ with ] *when* both said interlock switch and sensor means *remain* in closed positions; and warning means for indicating the occurrence of said unsafe operating condition.

5. The system according to claim 4 wherein said warning means are audible.

6. The system according to claim 4 wherein said warning means are visible.

*7. A safety interlock system for electrical apparatus comprising:*

*electrical circuit means for coupling a voltage source to a load;*

*said circuit means comprising mechanically actuated interlock switch means connected in said circuit means between one terminal of said voltage source and one terminal of said load;*

*sensor switch means mechanically actuated and connected in series with said interlock switch means, resistive heating means, and said voltage source for detecting a malfunction of said interlock switch means;*

*said interlock switch means being normally closed and said sensor means being normally open when said apparatus is operating; and*

*thermally actuated switch means responsive to thermal energy from said resistive heating means and connected in said electrical circuit means in series with said voltage source and said load and in series with said sensor means, said resistive heating means, said interlock switch means, and said voltage source and which opens in response to said thermal energy produced by current through said sensor means and said resistive heating means to disable said electrical circuit means when both said interlock switch and said sensor means remain in closed positions.*

*8. The safety interlock system according to claim 7 wherein:*

*said thermally actuated switch means comprises a thermally disintegratable element.*

*9. The safety interlock system according to claim 7 wherein:*

*said thermally actuated switch means comprises a resettable switch.*

* * * * *

UNITED STATES PATENT OFFICE

CERTIFICATE OF CORRECTION

Patent No. Re. 28,822 Dated May 18, 1976

Inventor(s) Rex E. Fritts

It is certified that error appears in the above-identified patent and that said Letters Patent are hereby corrected as shown below:

Column 1, line 39, change "other" to -- over --

Column 7, line 34, insert means after disabling

Column 7, line 54, change "electric" to -- electrical --

Signed and Sealed this

Sixteenth Day of November 1976

[SEAL]

*Attest:*

RUTH C. MASON
*Attesting Officer*

C. MARSHALL DANN
*Commissioner of Patents and Trademarks*